Figure 1:
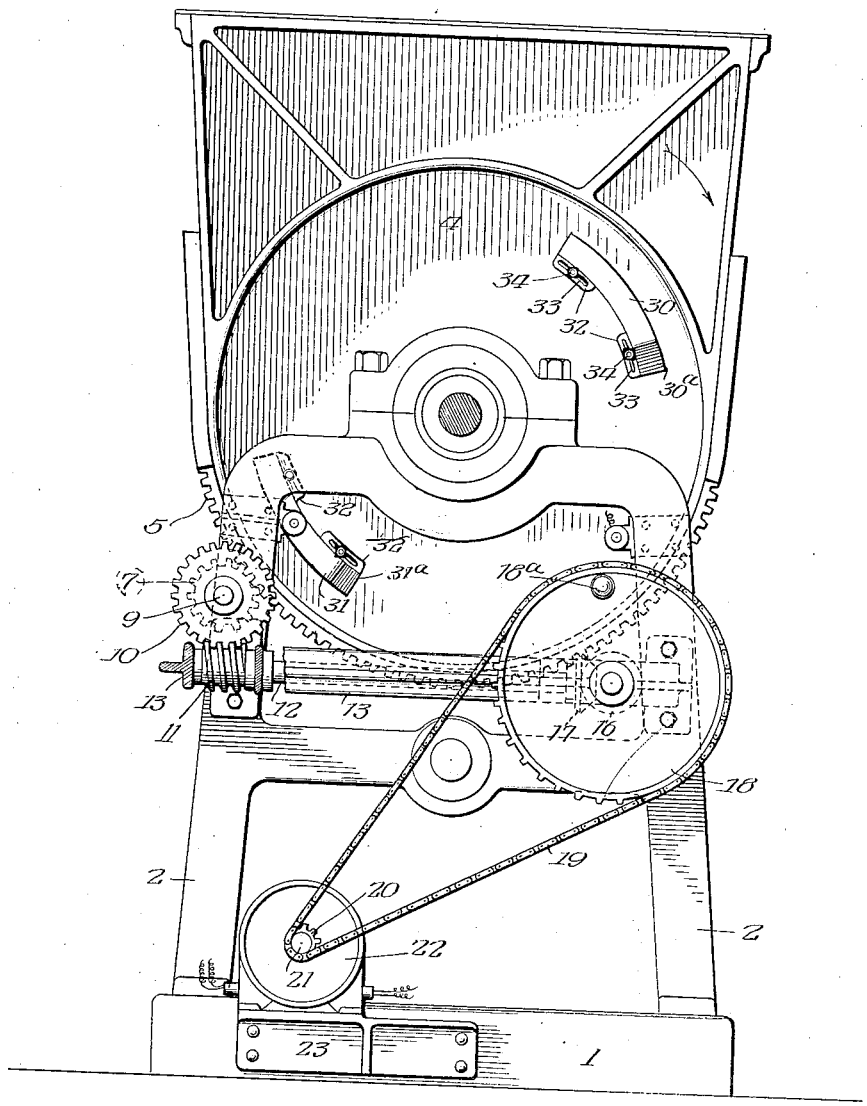

G. ROYAN.
MIXING MACHINE.
APPLICATION FILED MAY 22, 1919.

1,336,862.

Patented Apr. 13, 1920.
4 SHEETS—SHEET 1.

Inventor
George Royan
By Pine Fisher & Clapp
Attys.

G. ROYAN.
MIXING MACHINE.
APPLICATION FILED MAY 22, 1919.
1,336,862.
Patented Apr. 13, 1920.
4 SHEETS—SHEET 2.
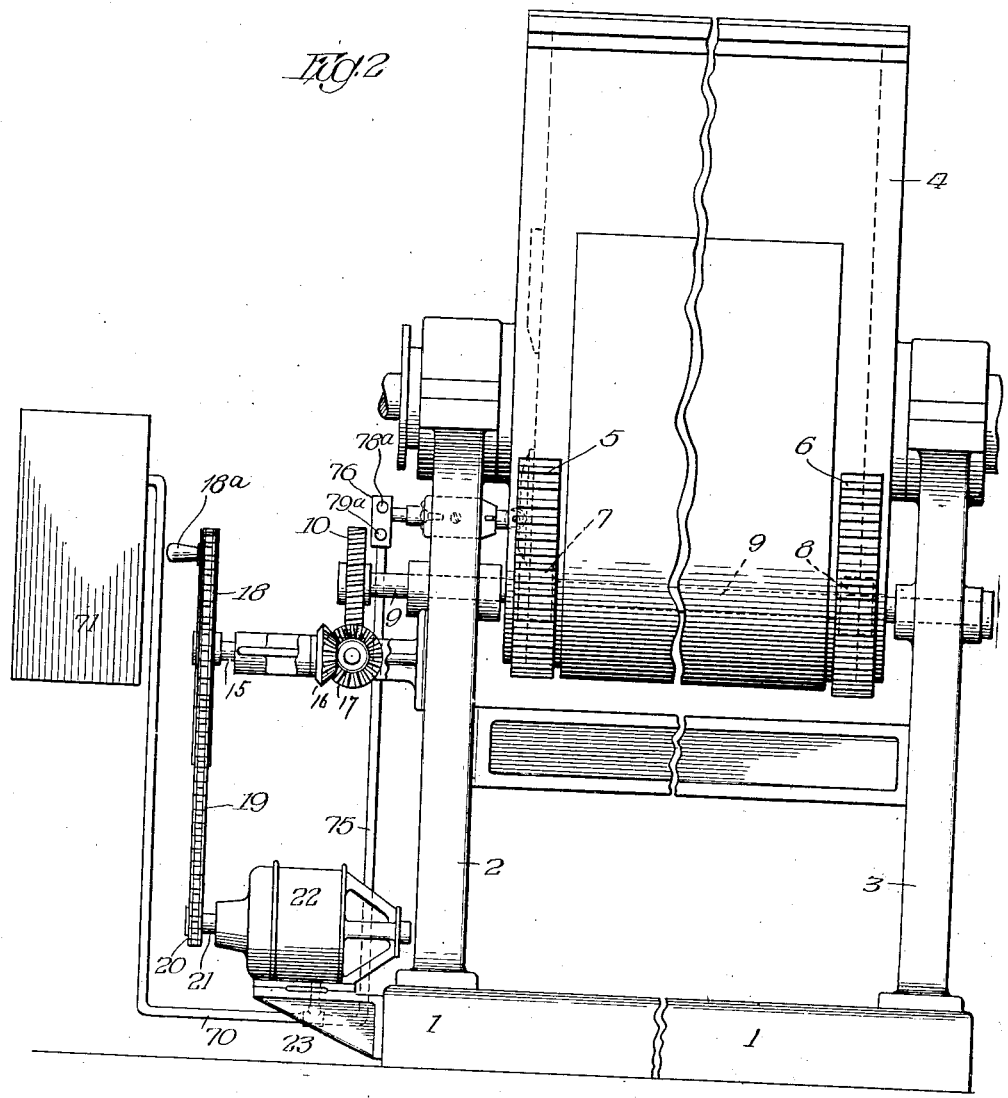

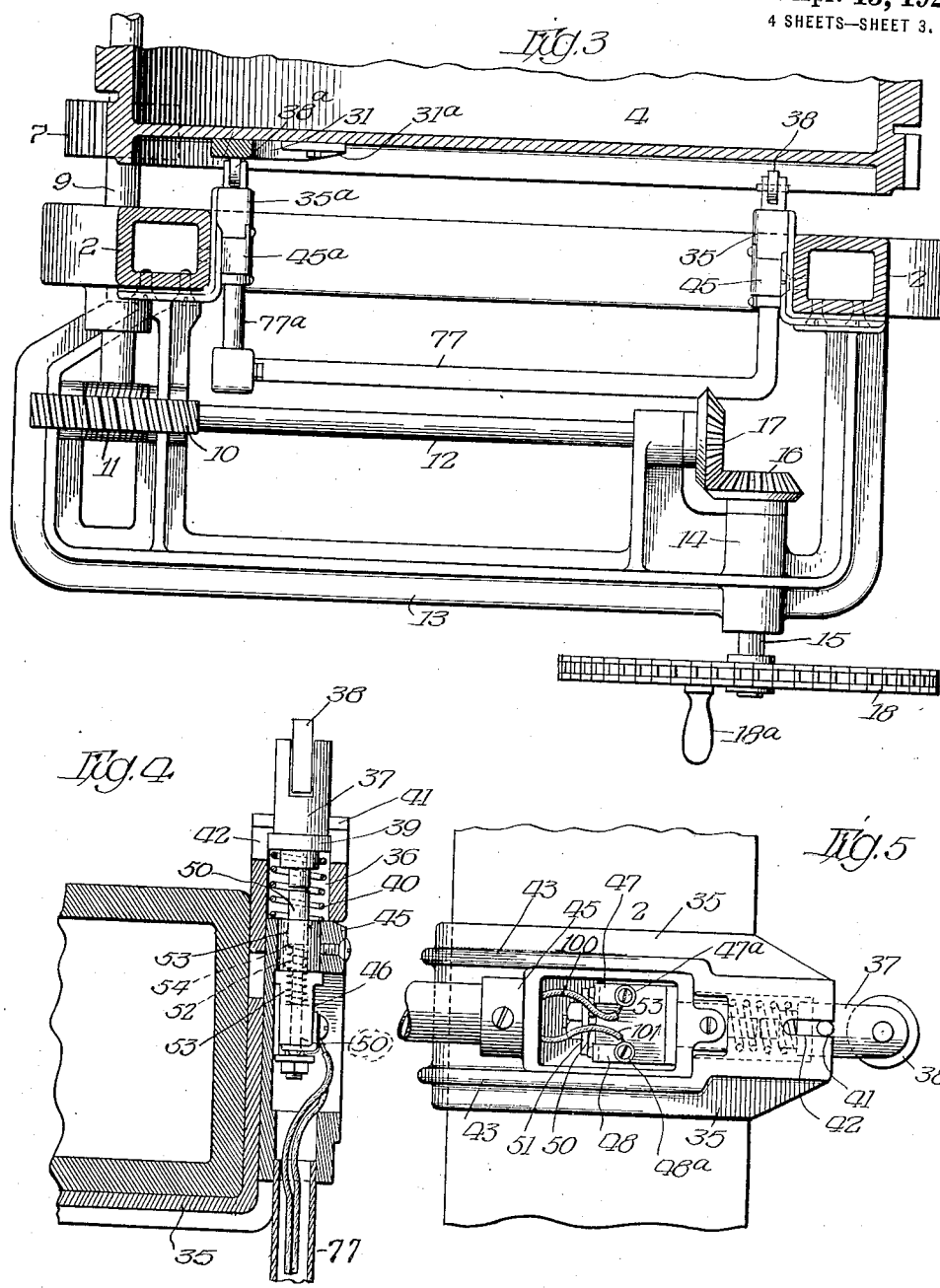

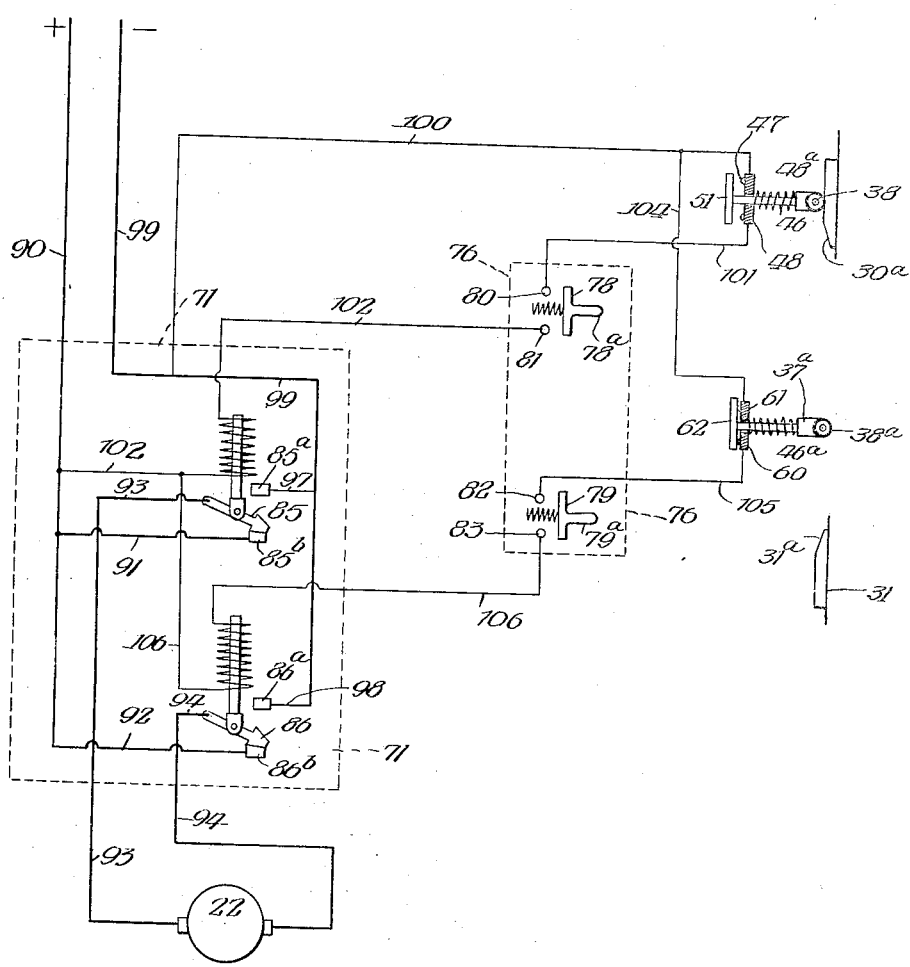

UNITED STATES PATENT OFFICE.

GEORGE ROYAN, OF CHICAGO, ILLINOIS, ASSIGNOR TO AMERICAN OVEN & MACHINE COMPANY, OF CHICAGO, ILLINOIS, A CORPORATION.

MIXING-MACHINE.

1,336,862.  Specification of Letters Patent.  Patented Apr. 13, 1920.

Application filed May 22, 1919. Serial No. 298,968.

*To all whom it may concern:*

Be it known that I, GEORGE ROYAN, a citizen of the United States, and a resident of Chicago, in the county of Cook and State of Illinois, have invented certain new and useful Improvements in Mixing-Machines, of which I do declare the following to be a full, clear, and exact description, reference being had to the accompanying drawings, forming a part of this specification.

The present invention, while susceptible of application to a variety of machines, is primarily designed to provide improved means for effecting and controlling the oscillating movements of the receptacles of mixing machines such as are used for the mixing of dough to be made into bread. The invention consists of the features of novelty hereinafter described, illustrated in the accompanying drawings and particularly pointed out in the claims at the end of this specification.

Figure 1 is a view in end elevation of a mixing machine having my invention applied thereto. Fig. 2 is a front view of the machine. Fig. 3 is a view on an enlarged scale in horizontal section through one end of the mixing receptacle and one of the side frames, parts being shown in plan. Fig. 4 is a view in longitudinal section on line 4—4 of Fig. 5. Fig. 5 is a detail view in elevation of one of the switch boxes and parts associated therewith. Fig. 6 is a diagrammatic view showing the electric circuits and switches whereby the passage of current through the motor in different directions is effected.

In the accompanying drawings my invention is shown as applied to the familiar type of dough mixing machine known as the "New Era mixer," such as illustrated in Letters Patent No. 831,372, granted to Notz and McBriar September 18, 1906. As shown, the machine comprises a bed plate 1 from the ends of which rise the side frames or standards 2 and 3, on the top of which are carried suitable bearings for the shaft of the mixing drum 4. This drum 4 has a lower circular portion and is provided with the usual cover, and partially around the circular lower portion of the drum adjacent its ends extend the rack bars 5 and 6 that mesh with pinions 7 and 8 on a drum tilting shaft 9 that is located at the back of the drum. The interior of the drum will be provided with suitable mixing blades but as these form no part of the present invention, I have not deemed it necessary to illustrate or describe them or the mechanism whereby they are operated. Upon one end of the tilting shaft 9 is mounted a worm wheel 10 that meshes with a worm 11 on the end of a countershaft 12. This countershaft 12 is journaled in suitable bearings carried by the yoke-shaped bracket 13 that is bolted to the front and rear standards of the side frame 2 of the machine. The bracket 13 is provided with a long bearing 14 in which is journaled a shaft 15 that has secured to its inner end a bevel pinion 16 that meshes with a bevel pinion 17 fixed to the countershaft 12.

Upon the outer end of the shaft 15 is mounted a sprocket wheel 18 over which passes a sprocket chain 19 that engages with a sprocket wheel 20 that is keyed to the end of the shaft 21 of an electric motor 22. This motor 22 is mounted on a bracket 23 that is bolted to the end of the bed plate 1 of the machine and is a "reversible" motor; that is to say, a motor the shaft of which may be driven in either direction, according as it is desired to tilt the mixing drum 4 from the upright or working position downwardly and forwardly to discharge its contents, or to restore the mixing drum from such discharge position to the working position. Thus, if it be assumed that the mixing drum is in upright or working position and it is desired to tilt the drum in the direction of the arrow Fig. 1, rotation in the proper direction will be imparted to the shaft 21 of the motor 22, thus causing the sprocket wheel 20, the chain 19 and the sprocket wheel 18 to impart revolution to the shaft 15 and through the bevel gear wheels 16 and 17 to the countershaft 12 and worm 11. The worm 11 meshing with the worm wheel 10 will impart revolution to the tilting shaft 9 and the pinions 7 and 8 on this shaft will, by engagement with the racks 5 and 6, cause the mixing drum 4 to tilt about its central shaft or trunnion, thereby swinging the open top of the mixing drum forwardly and downwardly until the contents are discharged therefrom. When, after the contents of the drum 4 have been discharged, it is desired to restore the drum to the upright or working position, it is only necessary to cause the shaft 21 of the motor 22 to revolve in the opposite direction.

The mechanism for causing the passage of current in either of two directions through the reversible motor 22 in order to discharge the contents of the drum 4 or restore the drum to working position, and the mechanism for automatically arresting the drum when it has reached the limit of its movement, will next be described: Upon the end of the drum 4 are secured the cam plates 30 and 31 having lugs 32 extending therefrom, these lugs being provided with long slots 33 through which pass screws 34 whereby the cam plates 30 and 31 are connected to the end of the drum. By providing the lugs 32 with slots 33, the cam plates 30 and 31 can be accurately set in proper position on the ends of the drum. The cam plate 30 has one of its ends formed with a cam $30^a$ and similarly, the cam plate 31 has one of its ends formed with a cam $31^a$, the function of which will presently appear.

To the front standard of the side frame 2 is bolted a bracket 35 that is preferably formed as a casting having its end chambered, as at 36, to receive a plunger 37, in the yoke-shaped end of which is journaled an anti-friction roller 38. As shown, the plunger 37 is provided with a shoulder 39 to limit its outward movement in the chamber 36, the plunger being forced normally outward by a spring 40 located within the chamber 36 and encircling a boss on the inner end of the plunger 37. A guide pin 41 secured to the side of the plunger 37 is adapted to move within a slot 42 of the bracket 35 and thus prevent the plunger from turning. As shown, the bracket 35 is formed on its outer face with ribs 43 between which is set an electric switch box 45. Within the switch box 45 is placed a normally closed switch 46 comprising contact plates 47 and 48 that are connected to electric binding posts $47^a$ and $48^a$. Between the contact plates 47 and 48 extends a plunger 50 to the inner end of which is secured a metal bridge plate 51 which normally bears against the contact plates 47 and 48 and serves to electrically connect these plates for the passage of current. The plunger 50 is encircled by a coil spring 52 that is held within the chambered block 53, while the outer end of the spring abuts a shoulder 54 connected to the outer end portion of the plunger 50, thus serving to force the plunger outward and normally hold the bridge plate 51 against the contact plates 47 and 48. The outer portion of the plunger 50 is of insulating material and projects through the end of the box 45 and within the coil spring 40 that bears against the end of the box 45. The roller 38 on the end of the plunger 37 projects normally into the path of the cam $30^a$ so that when the mixing drum 4 is turned forwardly and downwardly to discharge its contents, the cam $30^a$ will contact with the roller 38 and will cause the plunger 37 to be forced inwardly until its inner end strikes the outer end of the plunger 50, forcing this plunger 50 backward and moving the bridge plate 51 away from the contact plates 47 and 48, thereby breaking the passage of current between said contact plates; and so long as the roller 38 is upon the cam $30^a$ or the cam plate 30, the passage of current through the contact plates within the switch box 45 will be arrested. The purpose of the switch within the switch box 45 is to automatically stop the passage of current through the electric motor 22 so that when the mixing drum has been turned forwardly and downwardly to the required extent, the cam $30^a$ on the end of the drum will serve to automatically arrest the further movement of the motor and prevent further downward tilting of the mixing drum 4, as will presently appear.

Upon the rear upright of the side frame 2 adjacent its top is secured a bracket $35^a$ similar in construction to the bracket 35 hereinbefore described, this bracket being chambered to receive the plunger $37^a$ that carries at its outer end an anti-friction roller $38^a$ adapted to coöperate with the cam plate 31 and cam $31^a$ on the end of the mixing drum. The bracket $35^a$ is provided with a switch box $45^a$ containing a normally closed switch similar to that contained within the switch box 45 hereinbefore described, this switch having contact plates 60 and 61. The contact plates 60 and 61 (see Fig. 6) are normally connected electrically by a bridge plate 62 carried upon the inner end of a plunger the outer end of which is adapted to be struck by the inner end of the plunger $37^a$. The roller $38^a$ on the end of the plunger $37^a$ projects normally in the path of the cam $31^a$ so that as the mixing drum 4 is swung from its discharge position to its upright or working position, the cam $31^a$ will contact with the roller $38^a$ and will force inward the plunger $37^a$ and shift the bridge plate 62 in the switch box $45^a$ so as to break the passage of current between the contact plates in said box. The cam plate 31 and its cam $31^a$ are located in such position on the end of the mixing drum 4 that the cam $31^a$ will contact with the roller $38^a$ at the time that the mixing drum reaches its upright or working position and at such time will open the switch $46^a$ within the switch box $45^a$ and will arrest the passage of current through the motor 22, as will presently more fully appear.

To the motor 22 is connected a pipe or conduit 70 that leads to a switch box or panel 71 that is conveniently located adjacent the machine, being supported if desired by the upper end of the conduit 70. This switch box 71 contains the switches that will control the passage of current through the working circuit within which the motor 22 is located. At a convenient point adjacent the front of the machine extends a pipe or conduit 75 to the upper end of which is fixed a push button box 76 containing the normally open switches 78 and 79 adapted to be closed respectively by the push buttons 78ª and 79ª. Within the push button box 76 are located the contact points or terminals 80 and 81 of the switch 78 and the contact points or terminals 82 and 83 of the switch 79. The switches 78 and 79 are of familiar type and are shown only in the diagrammatic view Fig. 6 of the drawings. So, also, the electric switches located within the switch box or panel 71 are of familiar construction, these switches being designated as 85 and 86, the contact plates of the switch 85 being designated as 85ª and 85ᵇ and the contact plates of the switch 86 being designated as 86ª and 86ᵇ, respectively. The contact plate 85ª of the switch 85 is connected by a branch wire 97 with one of the main line wires 99, while the contact 85ᵇ is connected by a branch wire 91 with the main line wire 90. The switch 85 is connected by wire 93 to the motor 22. The switch 86 is connected to the motor 22 by the wire 94, the terminal 86ª of the switch 86 being connected by branch wire 98 to main wire 99, while the terminal 86ᵇ is connected by branch wire 92 to main wire 90.

The solenoid magnet of the switch 85 is connected to the main line wire 90 and by wire 102 to the contact plate 81 of the push button switch 78, the contact plate 80 of this switch being connected by wire 101 to the contact plate 47ª of the switch 46, while the contact plate 48ª of this switch is connected to the wire 100 that leads to main line 99. The solenoid magnet of switch 86 is connected on one side by wires 106 and 102 to the main line wire 90 and on its opposite side is connected by wire 106 to the contact plate 83 of push button switch 79. The contact plate 82 of switch 79 is connected by wire 105 to contact plate 60 of switch 46ª and the contact plate 61 of switch 46ª is connected by branch wire 104 to wire 100 leading to main line wire 99. The wires leading from the panel or switch box 71 to the motor 22 are passed through a tubular conduit 70 and one set of wires leading from the push button box 76 to the switch box or panel 71 will pass through a tubular conduit 75 and through the conduit 70 to the switch box panel 71, while the wires leading from the push button box 76 to the switch boxes 45 and 45ª will pass through the tubular conduit 77 and 77ª (see Figs. 1 and 3).

The push button switch 78 is adapted to cause the passage of current through the motor 22 when it is desired to turn the mixing drum or receptacle 4 forwardly and downwardly to discharge its contents and the push button switch 79 is adapted to effect a reverse movement of the motor 22 in order to restore the mixing drum or receptacle 4 to its upright or working position.

From the foregoing description, the operation of the apparatus will be seen to be as follows: Assume that the several switches are in the positions shown in Fig. 6 of the drawing, but with the switch 51 closed instead of open as shown. If now the operator, by pressing upon the push button 78ª closes the circuit of its switch, current through the controlling circuit in which such switch is located will pass from main line wire 90, by wire 102, through magnet of switch 85, through push button switch 78, by wire 101, through switch 46, by wire 100, to main line wire 99. This will shift the switch 85 and cause the main line current to pass from wire 90 by branch wire 92 through switch 86 and wire 94, through motor 22 to wire 93, thence through switch 85, contact plate 85ª and branch wire 97 to main line wire 99. This passage of current through the motor will be in such direction as to cause the mechanism hereinbefore described to tilt the mixing drum forwardly and downwardly and this tilting movement will continue so long as the operator holds the push button switch 78 closed and until the control circuit is broken by the cam 30ª on the end of the mixing drum striking the roller 38 and opening the switch 46. This opening of the switch 46 by breaking the passage of current through the controlling circuit and through the magnet of switch 85 allows the switch 85 to break the working circuit at the contact plate 85ª. The several switches will then be in the position shown by Fig. 6 of the drawing.

When it is desired to restore the mixing drum or receptacle 4 to upright or working position, the operator will close the push button switch 79, causing current to pass from main line wire 90 by wires 102 and 106 through the solenoid magnet of switch 86 and thence through push button switch 79, through switch 46ª and wires 104 and 100 to main line wire 99. The effect of this will be to close the switch 86 at the contact plate 86ª and current will then pass from main line wire 90 by wire 91 through switch 85, through wire 93 to the motor 22 and thence by wire 94 through switch 86 and its contact plate 86ª, through branch wire 98 to main line wire 99. The effect of this will be to cause the shaft of the motor to revolve in the direction opposite from that hereinbefore described and through the connections between the motor shaft and the drum tilting shaft to restore the drum to operative or working position. As the mixing drum 4 approaches the limit of its upward movement, the cam 31ª at the end of the cam plate 31 will contact with the roller 38ª and open the switch 46ª, allowing the switch 86 to shift from the position last described to the position shown in Fig. 6, arresting the passage of current through the motor 22.

The operator can arrest the mixing drum at any point in its upward or downward travel by removing his hand from the push button box, and if it is desired to shift the mixing drum manually, this can be accomplished by his grasping the handle 18ª with which the sprocket wheel 18 is preferably furnished.

Having thus described my invention, what I claim as new and desire to secure by Letters Patent is:—

1. In apparatus of the character described, the combination with a mixing drum and with means for tilting the same, of stop devices adjustably mounted upon said drum and means with which said adjustable stop devices coöperate to arrest the movement of the drum.

2. In apparatus of the character described, the combination with a mixing drum and with means for tilting the same, of a plurality of cams adjustably mounted on said drum, and means with which said cams coöperate to arrest the movement of the drum.

3. In apparatus of the character described, the combination with a mixing drum and with an electric motor suitably geared thereto for tilting said drum, of a plurality of switches for controlling the passage of current through said motor, and a plurality of stop devices mounted upon the drum for actuating said switches to throw said motor out of action as the drum reaches the limits of its tilting movements.

4. In apparatus of the character described, the combination with a mixing drum and with an electric motor suitably geared thereto for tilting said drum, of switch mechanism for controlling the passage of current through said motor, and an adjustable stop device mounted upon said drum for actuating said switch mechanism to throw said motor out of operation.

5. In apparatus of the character described, the combination of a mixing drum and with an electric motor suitably geared thereto for tilting said drum, of a plurality of switches arranged in proximity to said drum for controlling the passage of current through said motor, and a plurality of cams upon said drum for actuating said switches to automatically throw said motor out of operation.

6. In apparatus of the character described, the combination with a mixing drum and with an electric motor geared thereto for tilting said drum, of a plurality of switches in the working circuit of said motor, a controlling circuit for said switches, manually operable switches arranged in said controlling circuit, supplemental switch mechanism also arranged in said controlling circuit, and stop mechanism connected with said drum for automatically actuating said supplemental switch mechanism to throw said motor out of operation.

7. In apparatus of the character described, the combination with a mixing drum and with an electric motor geared thereto for tilting said drum, of a plurality of switches in the working circuit of said motor, a controlling circuit for said switches, normally open, manually operable switches arranged in said controlling circuit, normally closed supplemental switch mechanism also arranged in said controlling circuit, and stop mechanism connected with said drum for automatically actuating said supplemental switch mechanism to throw said motor out of operation.

8. In apparatus of the character described, the combination of a mixing drum provided with rack mechanism, a drum tilting shaft geared to said rack mechanism, a countershaft, worm gearing connecting said countershaft with said drum tilting shaft, a motor, gearing connecting said countershaft with the shaft of said motor, switch mechanism for controlling the passage of current through said motor, and stop mechanism connecting with said mixing drum for automatically throwing said gearing out of action as said mixing drum reaches the limit of its tilting movement.

GEORGE ROYAN.